(12) United States Patent
Hall

(10) Patent No.: US 11,915,467 B1
(45) Date of Patent: Feb. 27, 2024

(54) SALIENCY FOR ANCHOR-BASED OBJECT DETECTION

(71) Applicant: Microsoft Technology Licensing, LLC, Redmond, WA (US)

(72) Inventor: James Brian Hall, Woodstock Valley, CT (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 17/819,305

(22) Filed: Aug. 11, 2022

(51) Int. Cl.
*G06V 10/48* (2022.01)
*G06V 10/771* (2022.01)

(52) U.S. Cl.
CPC ............ *G06V 10/48* (2022.01); *G06V 10/771* (2022.01)

(58) Field of Classification Search
CPC ...... G06V 10/771; G06V 10/10; G06V 10/20; G06V 10/40; G06V 10/764; G06V 10/454; G06V 10/70; G06V 10/82; G06V 10/48; G06V 30/18067; G06V 10/462; G06V 30/18143; G06V 10/473; G06V 30/1831; G06F 18/00; G06F 18/211; G06F 18/2111; G06F 18/2113; G06F 18/2115; G06T 2207/20084; G06T 2207/20081; G06T 2210/12; G06N 3/02; G06N 3/0464; G06N 3/04; G06N 20/00
See application file for complete search history.

(56) References Cited

U.S. PATENT DOCUMENTS

| 9,858,496 | B2 | 1/2018 | Sun et al. |
| 10,210,432 | B2 | 2/2019 | Pisoni |
| 10,657,364 | B2 | 5/2020 | El-khamy et al. |
| 11,238,314 | B2 | 2/2022 | Chadha et al. |
| 2022/0058431 | A1 | 2/2022 | Jang et al. |

OTHER PUBLICATIONS

Petsiuk, et al., "Black-Box Explanation of Object Detectors via Saliency Maps", In Repository of arXiv:2006.03204v2, Jun. 10, 2021, 15 Pages.
Rosebrock, Adrian, "Turning any CNN Image Classifier into an Object Detector with Keras, TensorFlow, and OpenCV", Retrieved from: https://pyimagesearch.com/2020/06/22/turning-any-cnn-image-classifier-into-an-object-detector-with-keras-tensorflow-and-opencv/, Jun. 22, 2020, 38 Pages.
Verma, Yugesh, "Explainable Image Classification using Faster R-CNN and Grad-Cam", Retrieved from: https://analyticsindiamag.com/explainable-image-classification-using-faster-r-cnn-and-grad-cam/, Mar. 9, 2022, 22 Pages.
(Continued)

*Primary Examiner* — Sumati Lefkowitz
*Assistant Examiner* — Michael Adam Shariff
(74) *Attorney, Agent, or Firm* — Barta, Jones & Foley, PLLC.

(57) ABSTRACT

Example solutions provide saliency for anchor-based object detection, and include: performing, with an object detector, a first object detection process on an image, wherein the first object detection process employs a plurality of anchor boxes; identifying an object detection result for the image; determining, from among the plurality of anchor boxes, a first anchor box associated with the object detection result; and while limiting the object detector to the first anchor box, generating, with the object detector, a saliency map for the image. In some examples, the saliency map is used for selecting further training data for the object detector. In some examples, the saliency map comprises a gradient-based saliency map, and is used for auditing or debugging the object detector.

20 Claims, 10 Drawing Sheets

(56) References Cited

OTHER PUBLICATIONS

Gildenblat, Jacob, "Tutorial: Class Activation Maps for Object Detection with Faster RCNN", Retrieved from: https://github.com/jacobgil/pytorch-grad-cam/blob/master/tutorials/Class%20Activation%20Maps%20for%20Object%20Detection%20With%20Faster%20RCNN.ipynb, Aug. 1, 2022, 11 Pages.

Lee, et al., "BBAM: Bounding Box Attribution Map for Weakly Supervised Semantic and Instance Segmentation", In Proceedings of the IEEE/CVF Conference on Computer Vision and Pattern Recognition, Jun. 19, 2021, pp. 2643-2652.

Lu, et al., "Advanced AI explainability for PyTorch", Retrieved from: https://github.com/jacobgil/pytorch-grad-cam, Aug. 13, 2022, 11 Pages.

Sun, et al., "Adaptive Saliency Biased Loss for Object Detection in Aerial Images", In Journal of IEEE Transactions on Geoscience and Remote Sensing, vol. 58, Issue 10, Oct. 2020, pp. 7154-7165.

Tsunakawa, et al., "Contrastive Relevance Propagation for Interpreting Predictions by a Single-Shot Object Detector", In Proceedings of International Joint Conference on Neural Networks, Jul. 14, 2019, 9 Pages.

Ivanovs, et al., "Perturbation-based Methods for Explaining Deep Neural Networks: A survey", In Journal of Pattern Recognition Letters, vol. 150, Jul. 21, 2021, pp. 228-234.

Limberg, et al., "You Only Look 10647 Times", In Repository of arXiv:2201.06159v1, Jan. 16, 2022, 8 Pages.

"International Search Report and Written Opinion issued in PCT Application No. PCT/US2023/027570", dated Oct. 11, 2023, 13 Pages.

Uddin, et al., "SaliencyMix: A Saliency Guided Data Augmentation Strategy for Better Regularization", In Repository of arXiv:2006.01791v2, Jul. 27, 2021, pp. 1-12.

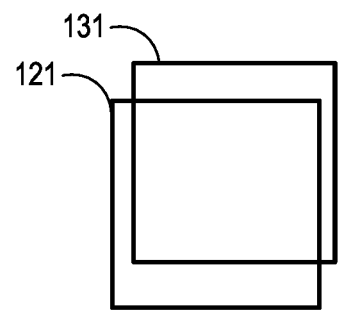
FIG. 3C
FIG. 4
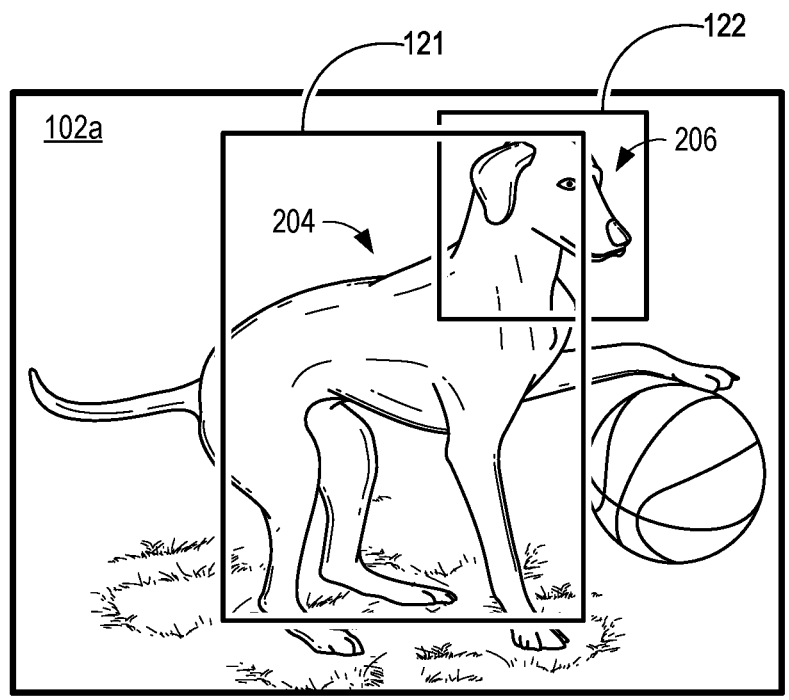

SALIENCY FOR ANCHOR-BASED OBJECT DETECTION

BACKGROUND

Object detectors often employ deep neural networks (DNNs). One of the aspects of DNNs that make them so powerful is that they can perform well on complex images, even in cases in which only a relatively small number of features are relevant to the detection. However, because of the highly complex structure of a DNN, it is often difficult to ascertain which features of an image contribute to the result.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Example solutions provide saliency for anchor-based object detection, and include: performing, with an object detector, a first object detection process on an image, wherein the first object detection process employs a plurality of anchor boxes; identifying an object detection result for the image; determining, from among the plurality of anchor boxes, a first anchor box associated with the object detection result; and while limiting the object detector to the first anchor box, generating, with the object detector, a saliency map for the image. In some examples, the saliency map is used for selecting further training data for the object detector. In some examples, the saliency map comprises a gradient-based saliency map, and is used for auditing or debugging the object detector.

BRIEF DESCRIPTION OF THE DRAWINGS

The disclosed examples are described in detail below with reference to the accompanying drawing figures listed below:

FIG. 3C illustrates a comparison in size and position for the anchor box and the bounding box of FIGS. 3A and 3B;

FIG. 4 illustrates a scenario in which multiple anchor boxes are associated with a detected object, as may occur when examples of the architecture of FIG. 1;

Corresponding reference characters indicate corresponding parts throughout the drawings.

DETAILED DESCRIPTION

Figure 1:
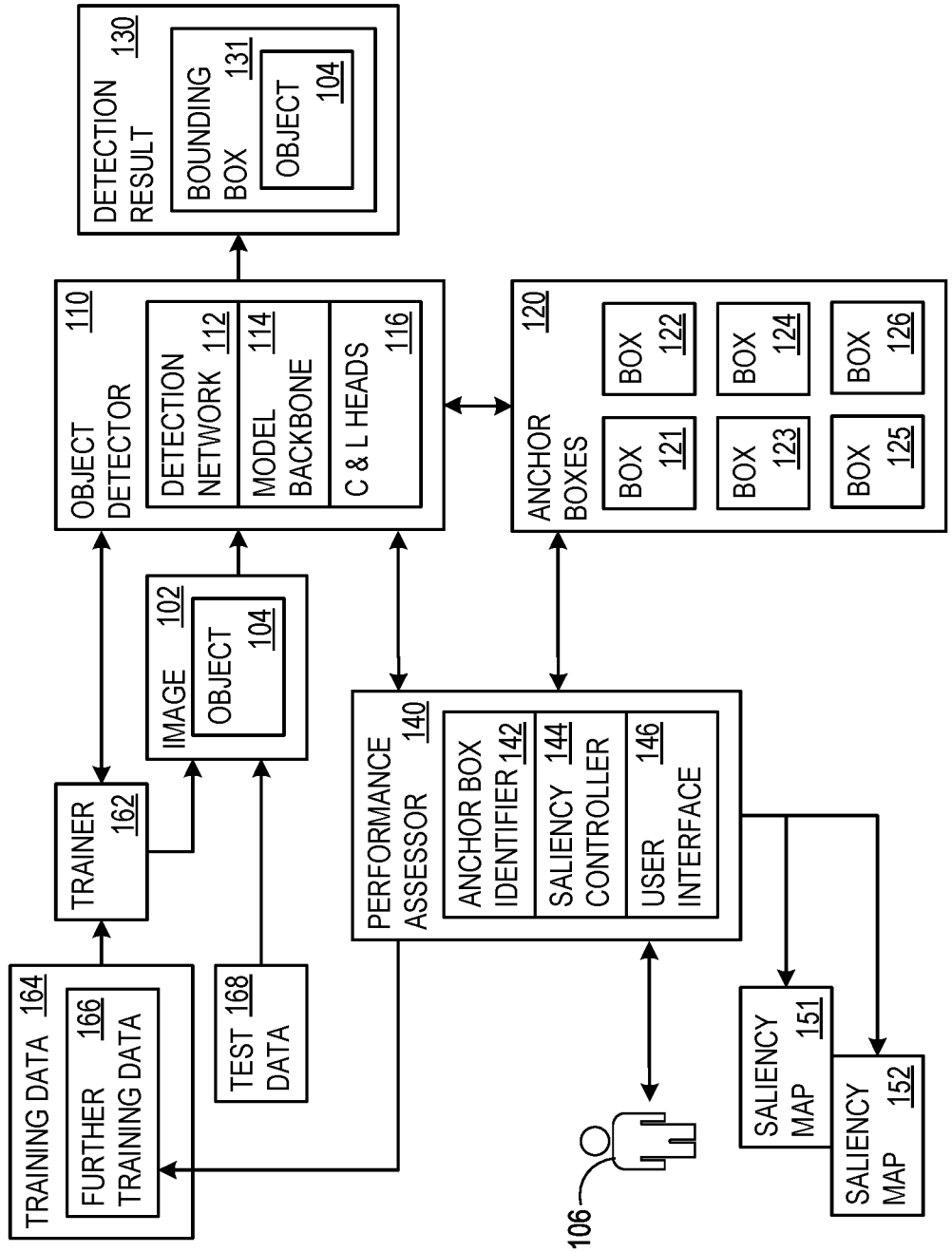
FIG. 1 illustrates an example architecture that advantageously provides saliency for anchor-based object detection.

The various examples will be described in detail with reference to the accompanying drawings. Wherever preferable, the same reference numbers will be used throughout the drawings to refer to the same or like parts. References made throughout this disclosure relating to specific examples and implementations are provided solely for illustrative purposes but, unless indicated to the contrary, are not meant to limit all examples.

Identifying the relevant features used by an object detector (whether DNN or another architecture) is often useful for determining whether training of the machine learning (ML) model is sufficient, and/or explaining erroneous results (e.g., debugging), so that further training data may be selected that specifically addresses the specific cause of the erroneous results.

Methods that identify aspects of data that contribute to a result are broadly known as explainability or saliency methods. For image data, the most common method of displaying the most relevant pixels is to create an overlay heatmap on the image, where brighter or "hotter" colored pixels (or otherwise highlighted) are those identified as being more relevant. These heatmaps are generally referred to as saliency maps. Saliency maps are often generated using gradient methods and are commonly used with image classification networks, which output a fixed set of scores, one for each potential class of object within an input image. Gradient methods are able to correlate the behavior of a target score (e.g., a confidence in a classification) with specific ones of the different pixels. This is highly valuable for models that have been trained with an automated pipeline.

Unfortunately, gradient methods are incompatible with common object detectors for multiple reasons, including due to the use of anchor boxes by those object detectors. Anchor boxes are a static set of predefined boxes that are overlaid on the image. To make predictions as to the location and classes of objects of interest in the image, the networks predict the anchor box that is most closely aligned to an object of interest, and then predicts a location offset, and height/width scaling to align the anchor box more closely to the object of interest, as well as a classification score for the object in the box. The set of anchor boxes is static, and for every image processed, each box produces an offset and classification score—these are then filtered down to a much smaller set of relevant boxes (often using objectness scoring and non-maximal suppression).

Additionally, common object detectors generally have non-static outputs, because the number and order of the set of detected objects will change as the input is changed. Unlike image classifiers, object detectors may output from none to multiple object detection results. For example, perturbations to the input image, which occur during the use of a gradient method, may cause an object detection to vanish or switch to a different object, frustrating attempts to track changes in the object detection results. Thus, the generation of gradient-based saliency maps, which has proved to be highly valuable for image classifiers, has not been compatible with common object detectors.

Example solutions described herein remove the obstacles identified above, that prevent the use of common saliency methods with common anchor-based object detectors. This includes removing the down-selection of anchors (or anchor boxes), which is a non-differentiable operation that prevents determining a gradient. This is an impediment to using gradient-based saliency methods, because such methods perform a differentiation process. In addition to newly permitting the use of differentiation, which opens up the wide range of common saliency methods to common anchor-based object detectors, removing the down-selection of anchors also renders the process static. This precludes another non-differentiable operation of common anchor-based object detectors, which re-order anchor boxes by score.

The use of the anchor boxes is retained, because it is central to the object detection process. However, an advantage of the disclosure herein is that the object detection process proceeds once, with the down-selection, and upon identification of a single anchor box of interest, generation of the saliency map is then possible because the other anchor boxes are no longer needed. It is the modified object detection process, in which the single anchor box remaining is known to contain the object, that is the differentiable and static version of the object detection process for which the saliency map may be generated.

Thus, example solutions described herein provide saliency for anchor-based object detection, and include: performing, with an object detector, a first object detection process on an image, wherein the first object detection process employs a plurality of anchor boxes; identifying an object detection result for the image; determining, from among the plurality of anchor boxes, a first anchor box associated with the object detection result; and while limiting the object detector to the first anchor box, generating, with the object detector, a saliency map for the image. In some examples, the saliency map is used for selecting further training data for the object detector. In some examples, the saliency map comprises a gradient-based saliency map, and is used for auditing or debugging the object detector.

Aspects of the disclosure improve the operation and efficiency of computing devices, for example, improving the accuracy of object detection by generating a saliency map for an image with an object detector that employs a plurality of anchor boxes. The saliency map enables determination of whether further training data is needed for the object detector, and if so, guides selection of training data. By identifying whether and what type of further training is needed, the object detector can be deployed, with confidence in its performance. Superfluous training may thus be avoided, providing power savings and time savings (i.e., increasing efficiency), without degrading accuracy. Aspects of the disclosure work within standard training flow, using standard training data.

FIG. 1 illustrates an example architecture 100 that advantageously provides saliency for anchor-based object detection. An anchor-based object detector 110 intakes (receives) an image 102 and performs an object detection process on image 102 to produce (generate) an object detection result 130. An object 104 within image 102 is identified within a bounding box 131 in object detection result 130. In some examples, bounding box 131 is specified in terms of pixel coordinates within image 102, such as side or corner locations of a rectangle, or a single corner location with height and width measurements in pixels. In some examples, image 102 is from a set of images within training data 164, and in some examples image 102 is from a set of test data 168.

Object detector 110 comprises a detection network 112 which has a model backbone 114, and taps for extracting intermediate data, such as classification and location heads 116. Model backbone 114 may be a deep neural network (DNN), a convolutional neural network (CNN), another type of neural network (NN), a transformer model, or another machine learning (ML) model. Object detector 110 employs a plurality of anchor boxes 120, illustrated as comprising a first anchor box 121, a second anchor box 122, an anchor box 123, an anchor box 124, an anchor box 125, and an anchor box 126, although it should be understood that a much larger number of anchor boxes are used by some examples.

Anchor boxes are a set of predefined boxes, each of a certain height and width, at predetermined locations within an image. Multiple sets of anchor boxes may be used of differing size and aspect ratio, dispersed within the image. Model backbone 114 encodes pixels most relevant for each anchor box, and then these encoded pixels are sent to an NN (or other ML model) for classification or object detection.

The use of a predetermined set of anchor boxes is generally faster than rastering a window through an image, sending the contents of the window to the NN at each raster position, and repeating with a changed window size and/or shape. The "best" anchor box is selected for refinement into a bounding box for an object detection result. Unfortunately, the speed improvement comes with a cost: The use of multiple anchor boxes requires down-selection, rendering the object detection process non-differentiable and precluding the use of gradient methods.

A performance assessor 140 is employed by a user 106 to evaluate object detector 110, for example by generating a saliency map 151, a saliency map 152, and other saliency maps. Performance assessor 140 has an anchor box identifier 142, a saliency controller 144, and a user interface (UI) 146. Anchor box identifier 142 taps into classification and location heads 116 to identify which anchor box of plurality of anchor boxes 120 was most responsible for object detection result 130 and was refined into bounding box 131. Saliency controller 144 employs a gradient method to generate saliency map 151 and/or saliency map 152 with object detector 110 for image 102. UI 146 receives input from user 106, for example to assist in selecting further training data 166 for use in further training object detector. Saliency map 151 comprises a set of highlighted pixels that contributed to the object detection result 130.

In operation, one example sequence of events may be that a trainer 162 trains object detector 110 using training data 164. In some examples, trainer 162 may be used in an automated pipeline. After initial training, object detector 110 is deployed for use in object detection tasks on test data 168. At some point, user 106 notices that object detection result 130 is erroneous, and wishes to investigate the cause. For example, in a security system employing cameras and automatic object detection of contraband, when there is a false positive detection, architecture 100 is able to highlight the confuser object(s). User 106 employs performance assessor 140 to generate saliency map 151.

Based on saliency map 151, user 106 identifies the feature(s) in image 102 that likely caused in the error (e.g., a false positive detection result). User 106 is then able to identify further training data 166 that has similar features and may be used to improve the training of object detector 110 to more accurately identify that type of feature, and provides input to UI 146 to select further training data 166. In some examples, performance assessor 140 has the ability to select further training data 166 on its own, without input from user 106.

Figure 2A:
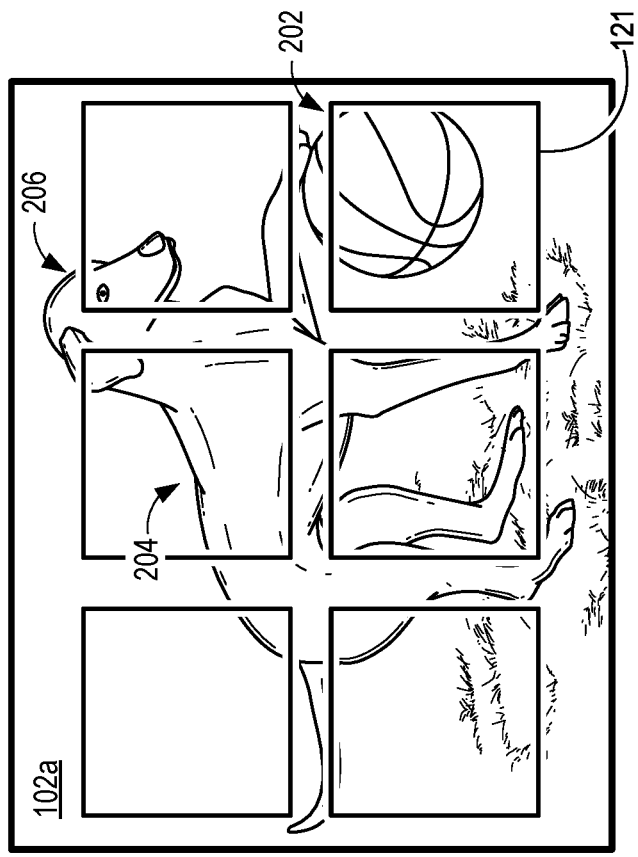
FIGS. 2A and 2B illustrate exemplary anchor boxes superimposed on an image, as may occur when examples of the architecture of FIG. 1.
Figure 2B:
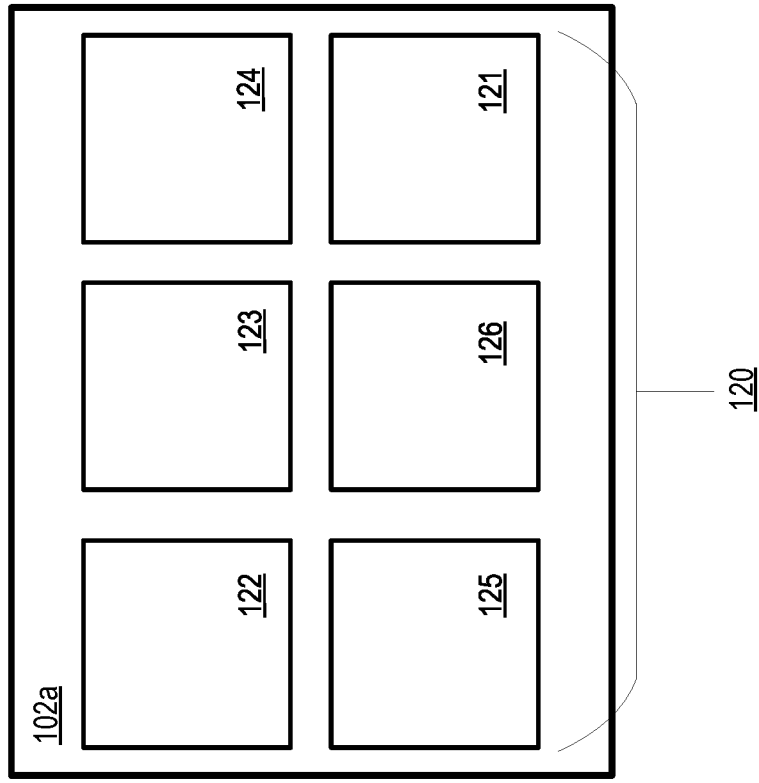

FIGS. 2A and 2B illustrate plurality of anchor boxes 120 superimposed on an image 102a. Image 102a is a possible example of image 102. For clarity, details of image 102a are suppressed in FIG. 2A, and labels of the anchor boxes, except for anchor box 121, are suppressed in FIG. 2B. It should be understood that, although a set of non-overlapping, same-size anchor boxes are illustrated, plurality of anchor boxes 120 may contain a large set of anchor boxes that overlap and vary in size and position. In image 102a, there are two primary objects 104: a ball 202 and a dog 204. A dog's head 206 is also identified, and its relevance will be further explained in relation to FIG. 4. In some examples, there will be an object detection result 130 for each of ball 202 and dog 204, and user 106 identifies the object detection result 130 for which to generate saliency map 151.

Figure 3A:
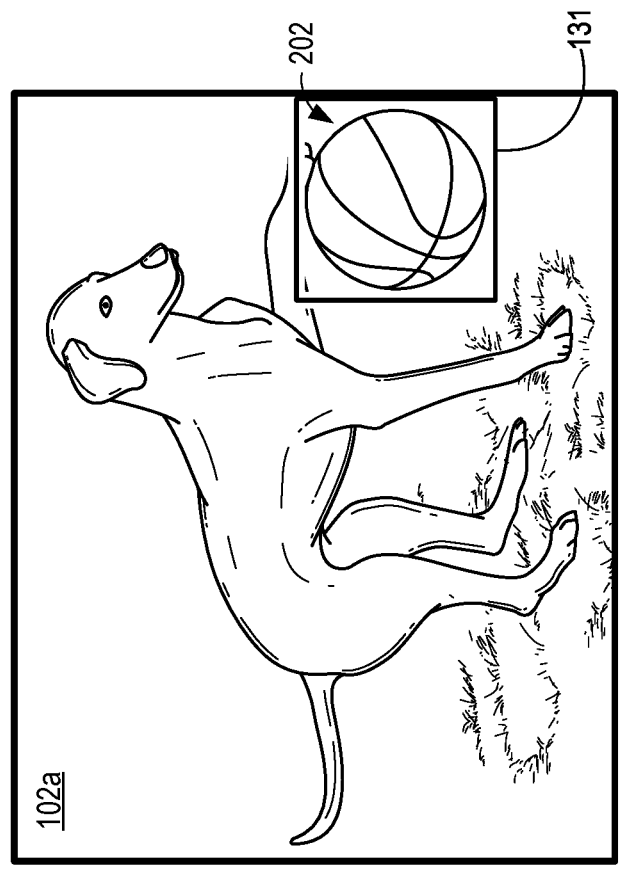
FIGS. 3A and 3B illustrate an anchor box and a bounding box for a detected object, as may occur when examples of the architecture of FIG. 1.

Anchor box 121 is the one that is used for object detection result 150 for ball 202, which is shown more clearly in FIG. 3A. However, because anchor box 121 is a predefined size, at a predetermined location, ball 202 is not centered in anchor box 121, and anchor box 121 is not tailored to ball 202. Rather, anchor box 121 is sufficient for model backbone 114 to detect ball 202. The process is this: Plurality of anchor boxes 120 is used to detect at least ball 202 and produce object detection result 130 with bounding box 131. (Another object detection result 130 may also be produced for dog 204 and/or dog's head 206, but this is addressed later.) Anchor box identifier 142 determines that anchor box 121 is the anchor box that is associated with object detection result 130 (i.e., anchor box 121 is the one that was refined into bounding box 131).

Saliency controller 144 then controls object detector 110 to suppress all other anchor boxes, except for anchor box 121 and runs object detector 110 repeatedly using gradient methods to generate saliency map 151. By suppressing all other anchor boxes, except one, the anchor box down-selection process is eliminated. This removes a non-differentiable operation that would otherwise prevent differentiation. Additionally, it renders the object detection process static, by precluding the possibility that a different anchor box might be selected as being most important to the output. If any other aspects of the object detection process also prevent differentiation, these are also suppressed by saliency controller 144, enabling the use of gradient-based methods to generate saliency map 151.

Figure 3B:
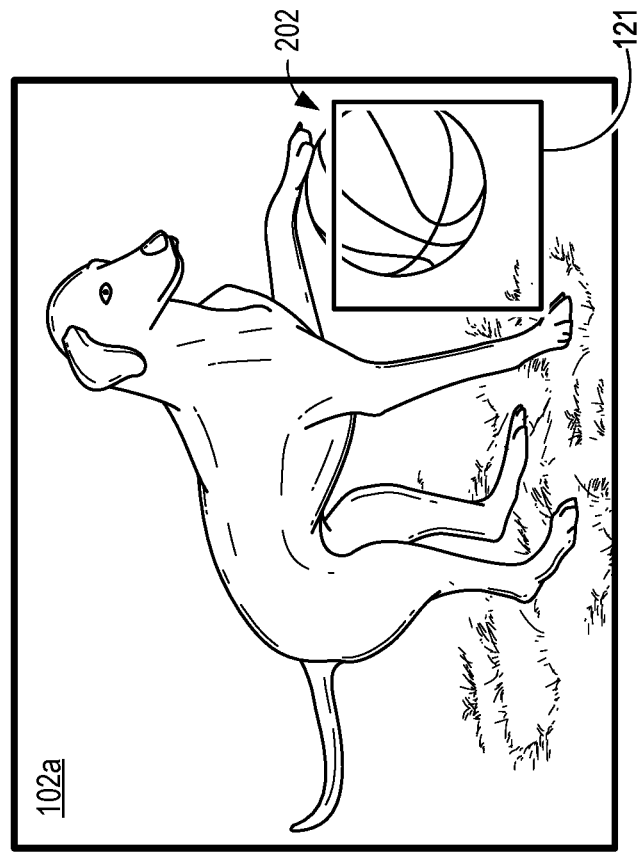

FIGS. 3A-3C illustrate a comparison between anchor box 121 and bounding box 131. Anchor box 121 is shown relative to ball 202 in FIG. 3A, bounding box 131 is shown relative to ball 202 in FIG. 3B, and FIG. 3C shows an overlay of anchor box 121 with bounding box 131. Because the size and position of anchor box 121 were defined prior to object detector 110 receiving image 102 and detecting ball 202, ball 202 is not centered in anchor box 121. However, after anchor box 121 is refined into bounding box 131, ball 202 is centered in bounding box 131, and the size of bounding box 131 is tailored to the size of ball 202. Therefore, in general, bounding box 131 will differ from anchor box 121 in size and/or position (i.e., size or position or both size and position).

FIG. 4 illustrates a scenario in which multiple anchor boxes are associated with detected dog 204. In FIG. 4, anchor box 121 is used to detect dog 204, containing most, although not all of dog 204. The amount of dog 204 that is within anchor box 121 is sufficient for model backbone 114 to identify dog 204. However, because dog's head 206 has such a distinctive shape, the amount of dog's head 206 within anchor box 122 is also sufficient for model backbone 114 to identify dog 204. Because dog's head 206 is partially outside anchor box 121 (e.g., the dog's nose, which is an important feature, is only found in anchor box 122), there may be value in generating two saliency maps for image 102, one using anchor boxes 121 and the other using anchor box 122. In such a scenario, saliency map 151 is generated using anchor box 121 and saliency map 152 is generated using anchor box 122. The general concept is that, when a detected object spans different anchor boxes and has multiple important features that may be in different anchor boxes, it may be desirable to generate multiple saliency maps for the image.

Figure 5:
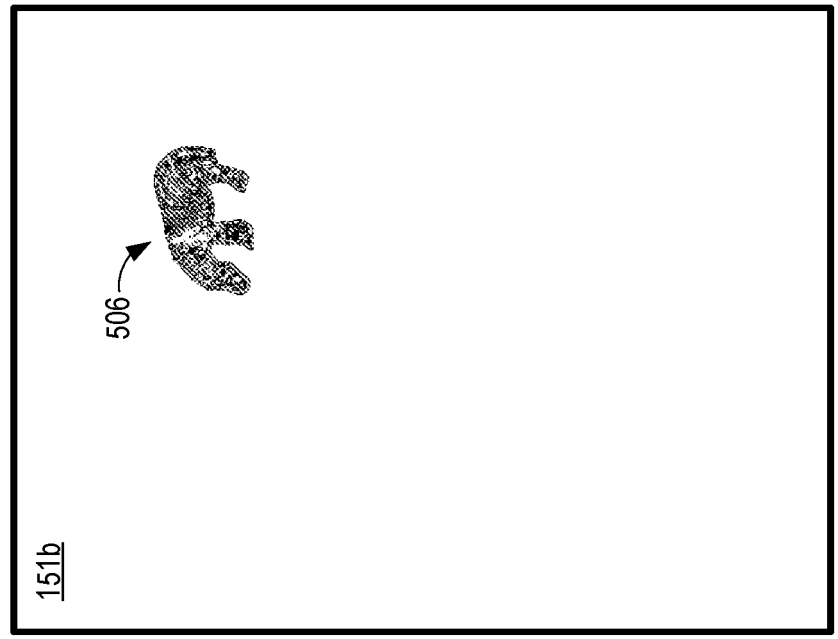
FIG. 5 illustrates an example input image and a saliency map for one of the detected objects, as may occur when examples of the architecture of FIG. 1.
Figure 5:
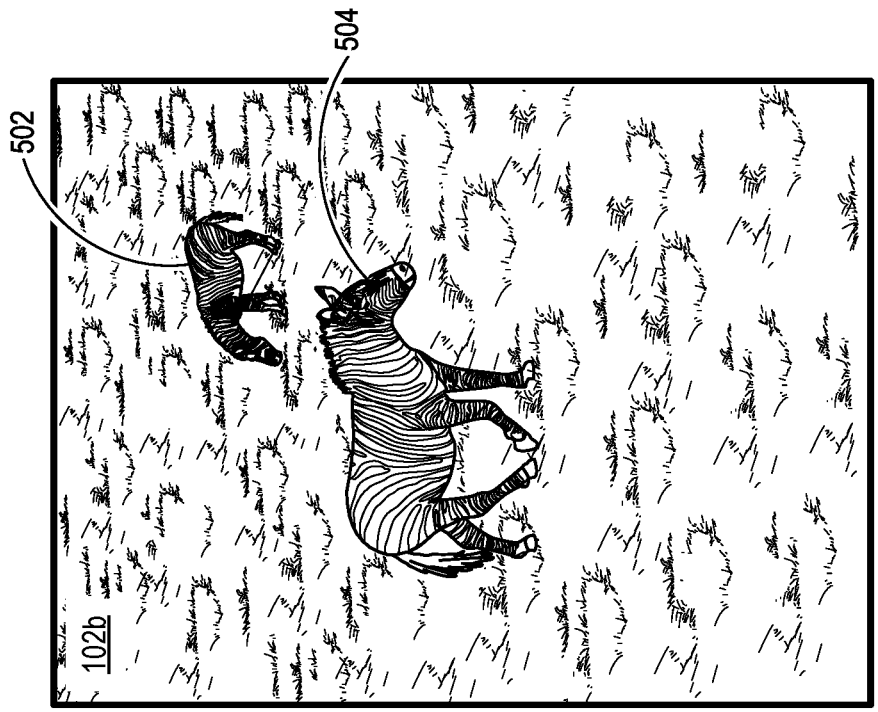

FIG. 5 illustrates an example image 102b and a saliency map 151b. Image 102b is a possible example of image 102, and saliency map 151b is a possible example of saliency map 151. Image 102b has at least two objects 104, a zebra 502 and a zebra 504. Saliency map 151b has a region 506 of bright pixels corresponding to zebra 502. In real-world examples, saliency map 151b is a color image with a generally dark background, except where region 506 of bright pixels is a bright color, such as yellow or red. The bright colors in region 506 indicate how significant pixels are to object detection result 130.

Figure 6:
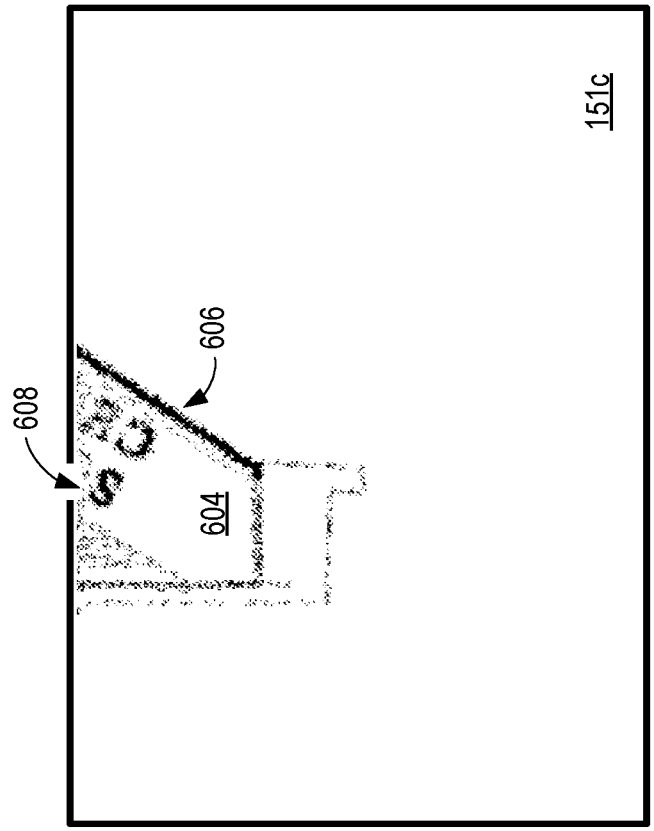
FIG. 6 illustrates an example input image with an incorrectly classified object and a saliency map for the classified object that identifies a basis for the incorrect classification, as may be advantageously observed when examples of the architecture of FIG. 1.
Figure 6:
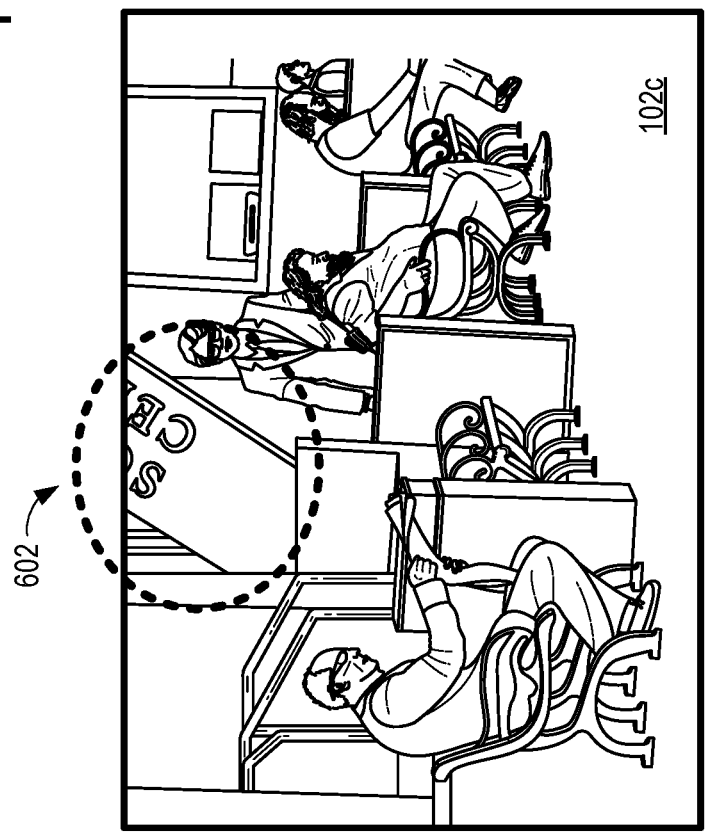

FIG. 6 illustrates an example image 102c and a saliency map 151b. Image 102c is a possible example of image 102, and saliency map 151c is a possible example of saliency map 151. For image 102c, object detection result 130 is erroneous (initially), and a sign 602 (shown within the dashed circle) is incorrectly classified as a stop sign. Upon generating saliency map 151c, a region 604 of bright pixels corresponding to sign 602 is produced. Two features that explain the erroneous classification are evident: a diagonal edge 606 of sign 602 and an S 608 on sign 602.

Upon examining saliency map 151c, user 106 becomes aware that further training data 166 is needed that contains signs with diagonal edges and/or the letter S, and which are identified by trainer 162 as not being a stop sign. Lacking saliency map 151c for debugging object detector 110, user 106 would have otherwise needed to speculate as to the cause(s) of the erroneous classification, and may have missed one. Further training data 166 may already be within training data 164, and is selected for further training epochs, or may be specifically collected and added to training data 164 after user 106 sees saliency map 151c.

Returning now to FIG. 1, further description of architecture 100 is provided. Architecture 100 is computationally efficient, applicable to a broad range of model architectures (both existing, and easily extendable to new architectures that employ anchor boxes), and specifically suited for explaining model behavior. It overcomes the non-static output challenge for common classes of DNNs so that many of the techniques used for image classification may now be extended to object detection.

Architecture 100 isolates the anchor box (from the list of all possible anchor boxes predicted) that is used to produce a prediction (e.g., object detection results), and then extracts the classification scores and offset of that box before filtering, discarding the scores of all other boxes. The scores are treated as static outputs and many of the attribution techniques used for classification may be applied to these scores. Because many attribution techniques seek to explain how a single score is influenced by the pixels of the original image (e.g., image 102), architecture 100 applies these techniques to leverage the backpropagation gradient of the anchor box edges to both the class score of the object in question to identify the pixels most relevant for the predicted anchor box offsets. This, in turn, provides information not only about why the object was classified as it was, but also identifies which pixels had the most influence on the predicted location of the detected object.

Users may wish to identify these pixels for many reasons, including: (1) Troubleshooting: When a DNN makes an incorrect prediction, it is useful to identify which parts of the image contributed to that decision. This insight can guide the ML practitioners on how to best improve the model. (2) Building confidence: Identifying the most relevant pixels serve as a "sanity check," that ensures that the pixels relevant to a model's predictions actually belong to the relevant object (and are not elsewhere in image 102). This builds confidence that the model will work on new data as expected. (3) Fairness and Bias Auditing: By identifying the relevant features a model uses to make a prediction, practitioners can ensure that a model is not using features that create problems with bias or fairness (e.g., ensuring that a model does not use demographic information about people present in an image to make a prediction). Architecture 100 thus provides valuable explainability of object detection result 130.

Developing saliency maps for image classification problems is relatively well studied. A common technique in many image classification saliency methods involves gradient methods. Gradient methods leverage the fact that the gradient of a function with respect to a variable measures how much changing that variable changes the function value. Modern software packages make it easy to take the gradient of a DNN with respect to the inputs, so gradient methods use the following relationship:

If F is a DNN, I is an image, y is the predicted class of that image, and $x_{ij}$ is the pixel in the $ij^{th}$ location of I:

$$F(I) = y \qquad \text{Eq. (1)}$$

$$\frac{\partial y}{\partial x_{ij}} = \frac{\partial F(I)}{\partial x_{ij}} \qquad \text{Eq. (2)}$$

The amount the prediction changes in response to changes of a certain pixel is the gradient of the DNN with respect to that pixel. In some scenarios, simply measuring the gradient of a label by itself may not be sufficient to produce high quality saliency maps. However, many techniques for saliency maps for image classification rely on computing the gradient of a DNN with respect to the input pixels as a key component.

While DNNs have been employed for image classification (e.g., identifying the class of the most prominent object in an image), DNNs have been adapted to a variety of other computer vision tasks such as object detection. Object detection is not simply identifying the most prominent object in an image, but rather identifying all relevant objects in an image, and localizing those objects within the image. In contrast to image classification, where the network only assigns an image a label, object detectors return a list of bounding boxes and associated labels.

Many DNNs that are specifically designed for object detection are anchor-based methods. These methods work by starting with a large set of predefined positions in the image where objects might occur ("anchors"), and defining anchor boxes at those positions. The approach is often to use a standard classification network without the final pooling layer or classification head to reduce the input image to a tensor with smaller spatial resolution but deeper channel depth, often called the feature tensor. Anchors are then associated with different pixels in this feature tensor, and then a non-differentiable set of operations is applied to select a small number of anchors most likely to contain objects of interest. The other anchors are ignored. In the final layers of the network, localization and classification heads are applied to the few selected anchors to determine the class of the object within the anchor, as well as offsets of the original anchor location to better match the precise location of the object within the image.

Breaking this procedure into fundamental network operations, the flow is:

$$f_{bb}(I) \rightarrow X_{feat} \qquad \text{Eq. (3)}$$

$$f_{sel}(X_{feat}, \{\alpha_i\}_i) \rightarrow \{\alpha_0^*, \alpha_1^*, \ldots, \alpha_n^*\} \qquad \text{Eq. (4)}$$

Eq. (3) represents computation of a feature vector, and Eq. (4) represents anchor selection. Eq. (5) is performed for each $\alpha^*$.

$$f_{cls,loc}(X_{feat}, \alpha_0^*) \rightarrow \{l_0, r_0, t_0, b_0, c_0\}$$

$$f_{cls,loc}(X_{feat}, \alpha_1^*) \rightarrow \{l_1, r_1, t_1, b_1, c_1\}$$

$$\ldots$$

$$f_{cls,loc}(X_{feat}, \alpha_n^*) \rightarrow \{l_n, r_n, t_n, b_n, c_n\} \qquad \text{Eq. (5)}$$

where $f_{bb}$ is model backbone 114, $f_{sel}$ is the set of selection operations that reduce the number of anchors, $\{\alpha_i\}_i$ is the set of initial anchors, $\alpha_i^*$ is the smaller set of selected anchors, and $f_{cls,loc}$ are the network layers that predict the final location and class of the selected bounding box. In the results, l is the left boundary, r is the right boundary, t is the top boundary, b is the bottom boundary, and c is the class of the detected object.

As noted above, standard gradient methods incompatible with anchor-based object detectors. This is because anchor-based object detectors are not differentiable and do not have static outputs. Due to the presence of the layer that selects anchors most likely to contain objects, object detectors are not differentiable. Therefore it is not possible to calculate a gradient with respect to the output bounding boxes. Additionally, many gradient based saliency methods require a static, unchanging output from the network to compute saliency maps. This is because many gradient methods corrupt or perturb the input image repeatedly and then compute the gradients of the target class on these perturbed images. This works fine for image classification, where the output is static—one score for every potential class. However, for object detectors, the output is dynamic—the number of predicted bounding boxes may change when the image is perturbed. Furthermore, the returned bounding boxes are usually ordered from most to least confident. This creates a subtle, yet significant, problem for gradient techniques.

For example, referring briefly to FIG. 2B, in one possible scenario, user 106 desires to compute a saliency map for a bounding box associated with dog 204. If model backbone 114 initially gives highest confidence to the bounding box associated with dog 204 with an unperturbed image, that bounding box will appear first in the list of returned boxes. However, when the image is perturbed, the highest confidence may then be given to a bounding box for ball 202, and the bounding box for dog 204 may be second. Now the gradients needed are associated with the second bounding box in the list, not the first, and it may not be easy to determine this without human intervention. Since many gradient methods involve a large number of perturbed images, the non-static nature of the object detection output creates a serious impediment to applying gradient techniques to object detectors.

Fortunately, once object detector 110 is trained, anchor box identifier 142 is able to identify the original anchor associated with each object detection results. This may be accomplished by running classification and location heads 116 on all of the initial anchor boxes until one matches the target bounding box, and then flagging the anchor that produces the match.

An example process includes: (1) Select a detection of interest. (2) Determine the anchor box associated with the detection of interest. (3) Remove all other anchor boxes. (4) Remove all non-differentiable filtering layers. Breaking this into network operations, starting with a detection of interest $\{l_0, r_0, t_0, b_0, c_0\}$, the process may be described as:

$$f_{rec}(l_0, r_0, t_0, b_0, c_0, \{\alpha_i\}) \rightarrow \alpha_j \quad \text{Eq. (6)}$$

$$F_{dif}(I) \rightarrow f_{cls,loc}(f_{bb}(I), \alpha_j) \quad \text{Eq. (7)}$$

Eq. (6) represents identifying the initial anchor, and Eq. (7) represents forming the model. The result is that the network now has only a single anchor box. Network predictions are now both regular (either 5 or 6 scalars: left, right, top, bottom, classification and possibly objectness, depending on the original architecture), and differentiable, as all non-differentiable layers have been removed. Using this, it is possible to compute the gradients of any of the output quantities with respect to the input image pixels. In some examples, this is performed according to Eq. (8):

$$\begin{pmatrix} \frac{\partial l_0}{\partial x_{ij}} \\ \frac{\partial r_0}{\partial x_{ij}} \\ \frac{\partial t_0}{\partial x_{ij}} \\ \frac{\partial b_0}{\partial x_{ij}} \\ \frac{\partial c_0}{\partial x_{ij}} \end{pmatrix} = \frac{\partial F_{dif}(I)}{\partial x_{ij}} = \frac{\partial (f_{cls,loc}(f_{bb}(I), \alpha_j))}{\partial x_{ij}} \quad \text{Eq. (8)}$$

Standard gradient based saliency techniques may be applied to any or all of the scalars, and return saliency maps for each, individually. These saliency maps provide insight into both which features the network used to determine the class of the object of interest, as well as the relevant pixels for how the bounding box was localized.

Aspects of the disclosure thus provide multiple advantages over other approaches to object detection saliency, such as: computationally efficiency, generalization across different architectures, and independence from target detections and even localizations within those detections. Additionally, explanations are determinable for both the class and the location of the bounding boxes.

Figure 7:
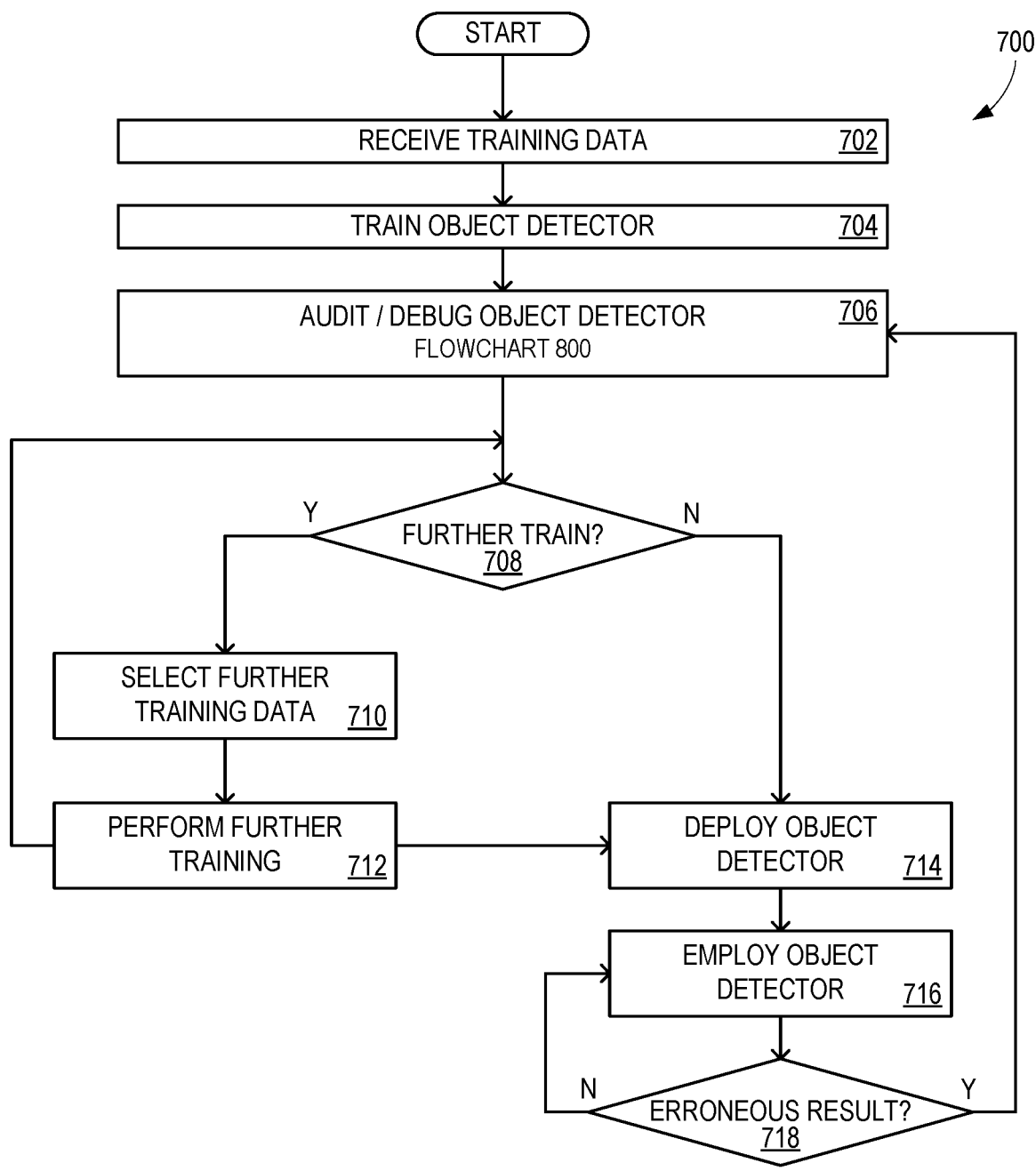
FIG. 7 shows a flowchart illustrating exemplary operations that may be performed using examples of the architecture of FIG. 1.

FIG. 7 shows a flowchart 700 illustrating exemplary operations that may be performed by architecture 100. In some examples, operations described for flowchart 800 are performed by computing device 1000 of FIG. 10. Flowchart 700 commences with receiving training data 164 for object detector 110 in operation 702. In some examples, object detector 110 comprises an anchor based object detector. Trainer 162 performs initial training of object detector 110 using training data 164 in operation 704.

Operation 706 includes auditing or debugging object detector 110. Auditing and debugging object detector 110 comprises generating at least saliency map 151, and possibly also saliency map 152 using flowchart 800. Auditing and debugging object detector 110 may be performed using attribution techniques such as SmoothGrad, Integrated Gradients, XRAI, and others, which explain how an object detection score (e.g., certainty) is influenced by various pixels of image 102. Auditing or debugging answer questions such as "when results are wrong, why?" and "if the results are correct, are they correct for the proper reason?"

Decision operation 708 determines whether object detector 110 requires further training, based on saliency map 151 saliency map 152. If further training is required, operation 710 includes, based on saliency map 151, selecting further training data 166 for object detector 110. In some examples, operation 710 further includes, based on saliency map 152, selecting further training data 166 for object detector 110. In some examples, saliency maps 151 and 152 each comprises a gradient-based saliency map. Further training data 166 may be selected based on confusers identified using saliency map results. In some examples, further training data 166 is already within training data 164. In some examples, further training data 166 is newly acquired and brought in to enrich training data 164.

In operation 712, trainer 162 further trains object detector 110 with the selected further training data 166. Flowchart 700 then either returns to decision operation 708 or proceeds to operation 714, which deploys object detector 110. Flowchart 700 also reaches operation 714 via a negative result in decision operation 708. Operation 716 employs object detector 110 for an object detection task.

Decision operation 718 determines whether an erroneous or anomalous object detection result 130 has been encountered. If not, operation 716 continues employing object detector 110 for further object detection tasks. However, if an erroneous or anomalous object detection result 130 has been encountered, flowchart 700 returns to operation 706 to identify the reason.

Figure 8:
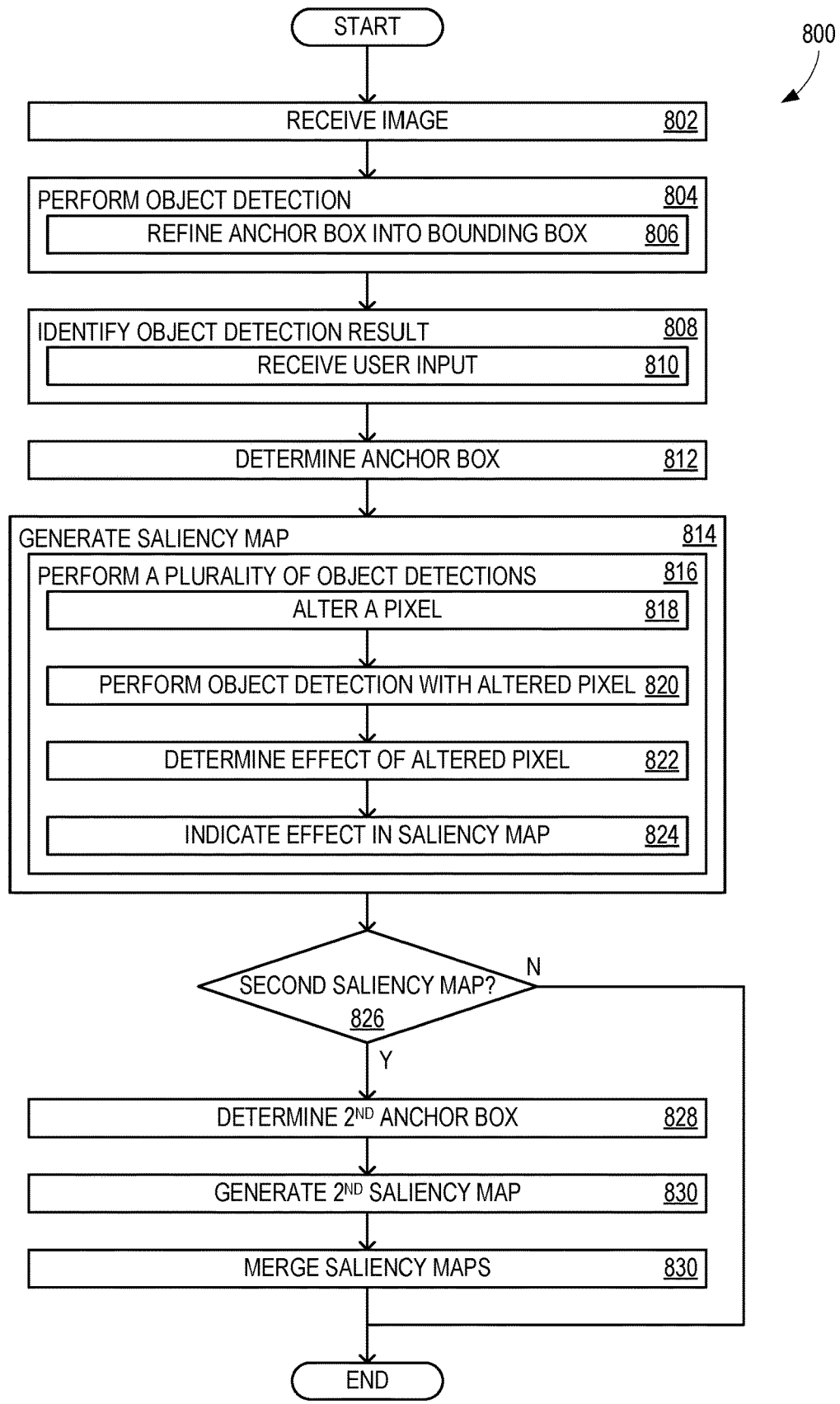
FIG. 8 shows a flowchart illustrating exemplary operations that may be performed using examples of the architecture of FIG. 1.

FIG. 8 shows a flowchart 800 illustrating exemplary operations that may be performed by architecture 100. In some examples, operations described for flowchart 800 are performed by computing device 1000 of FIG. 10. Flowchart 800 commences with receiving image 102 in operation 802. In some examples, image 102 is within training data 164 or test data 168.

Operation 804, includes operation 806, performs an object detection process on image 102 with object detector 110. In some examples, the object detection process employs plurality of anchor boxes 120. Operation 806 refines anchor box 121 into bounding box 131 as part of the object detection process. Operation 808 identifies object detection result 130 for image 102, to use for generating saliency map 151. Object detection result 130 identifies bounding box 131 that overlaps with anchor box 121 in image 102 and differs from anchor box 121 in size or position or both size and position. In some examples, operation 808 uses operation 810, such that identifying object detection result 130 comprises receiving an input from UI 146. This may occur when multiple object detection results 130 are returned for each of multiple objects 104 in image 102 (e.g., ball 202 and dog 204 in FIG. 2B). User 106 then has the ability to select which object to use for generating saliency map 151.

In operation 812, anchor box identifier determines, from among plurality of anchor boxes 120, that anchor box 121 is associated with object detection result 130. In operation 814, saliency controller 144 limits object detector 110 to anchor box 121 and generates saliency map 151 for image 102 with object detector 110. Generating saliency map 151 comprises not employing another anchor box of plurality of anchor boxes 120, other than anchor box 121. If saliency map 152 is also generated, saliency controller 144 will limit object detector 110 to anchor box 122, and not employ another anchor box of plurality of anchor boxes 120, other than anchor box 122. In some examples, saliency maps 151 and 152 each comprises a gradient-based saliency map, and generating saliency map 151 or 152 comprises determining a gradient. In general, generating saliency map 151 or 152 comprises suppressing non-differentiable filtering layers of object detector 110, and applying an attribution technique.

Operation 814 is performed using operation 816, which performs a plurality of object detection processes on image 102 with object detector 110. Operation 816 is carried out using operations 818-824, of which operations 818-822 determine a gradient for image 102. Operation 818 alters a pixel of image 102, and operation 820 performing an object detection process on image 102 with the altered pixel. Operation 822 determines the effect of altering the pixel on the object detection process, and operation 824 indicates, in saliency map 151, the effect of altering the pixel. That is operation 824 indicates the gradient (determined by operations 818-822) in saliency map 151. This process is repeated for the other pixels, at least within anchor box 121, to build out saliency map 151, although some examples may extend operation 816 to include pixels outside anchor box 121.

Decision operation 826 determines whether saliency map 152 is also useful. This may occur when multiple anchor boxes each have relevant features, and one anchor box has an important feature that is not in the other, such as illustrated in FIG. 4. If not, flowchart 800 is complete.

If, however, saliency map 152 is to be generated, operation 828 determines, from among plurality of anchor boxes 120, anchor box 122 associated with object detection result 130. Anchor box 122 differs from anchor box 121 in size or position or both size and position, and may be determined similarly as described for operation 812. In some examples, bounding box 131 also overlaps with anchor box 122 in image 102 and differs from anchor box 122 in size or position or both size and position. Operation 830 includes, while limiting object detector 110 to anchor box 122, generating, with object detector 110, saliency map 152 for image 102. This is performed as described for operation 814. Optionally, in some examples, operation 832 merges saliency map 151 with saliency map 152, and returns a single result of saliency map 151. In some examples, saliency map 151 and saliency map 152 are not merged, but instead are returned separately.

Figure 9:
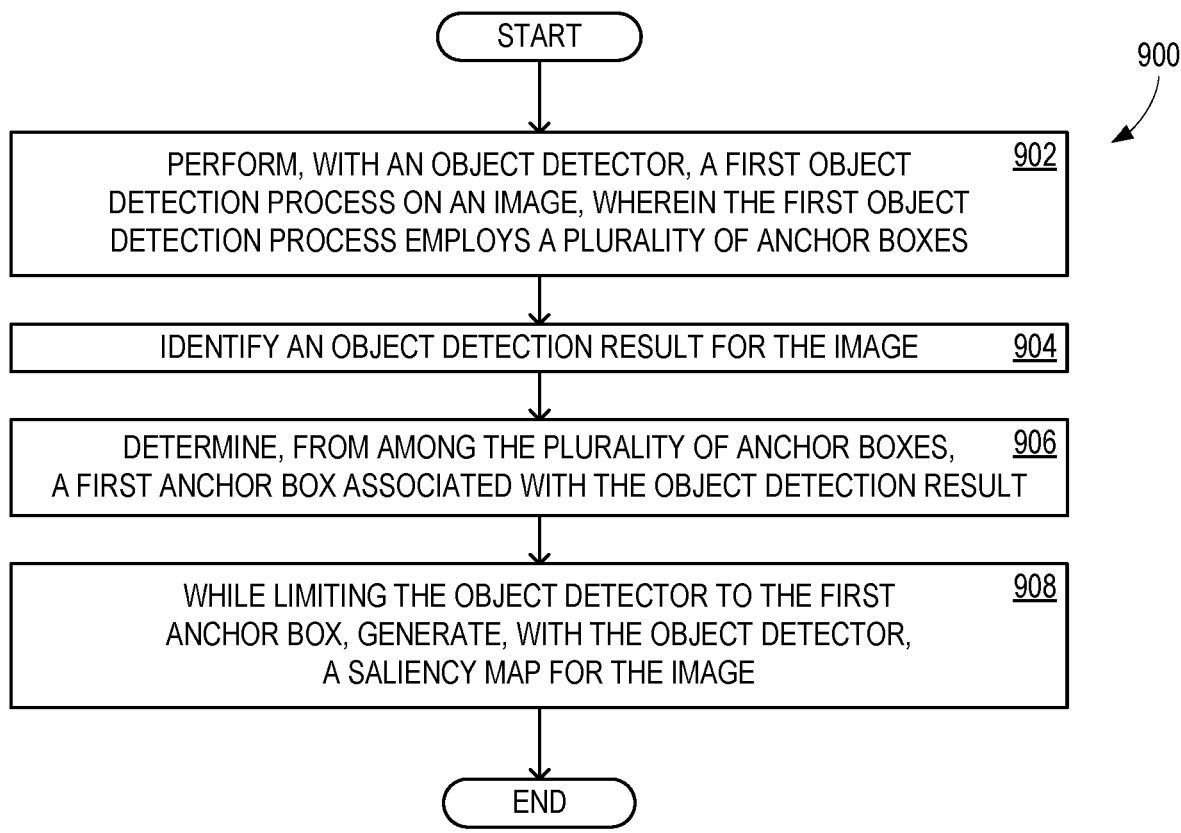
FIG. 9 shows another flowchart illustrating exemplary operations that may be performed using examples of the architecture of FIG. 1.

FIG. 9 shows a flowchart 900 illustrating exemplary operations that may be performed by architecture 100. In some examples, operations described for flowchart 900 are performed by computing device 1000 of FIG. 10. Flowchart 900 commences with operation 902, which includes performing, with an object detector, a first object detection process on an image, wherein the first object detection process employs a plurality of anchor boxes. Operation 904 includes identifying an object detection result for the image. Operation 906 includes determining, from among the plurality of anchor boxes, a first anchor box associated with the object detection result. Operation 908 includes, while limiting the object detector to the first anchor box, generating, with the object detector, a saliency map for the image.

Additional Examples

An example system comprises: a processor; and a computer-readable medium storing instructions that are operative upon execution by the processor to: perform, with an object detector, a first object detection process on an image, wherein the first object detection process employs a plurality of anchor boxes; identify an object detection result for the image; determine, from among the plurality of anchor boxes, a first anchor box associated with the object detection result; and while limiting the object detector to the first anchor box, generate, with the object detector, a saliency map for the image.

An example computerized method comprises: performing, with an object detector, a first object detection process on an image, wherein the first object detection process employs a plurality of anchor boxes; identifying an object detection result for the image; determining, from among the plurality of anchor boxes, a first anchor box associated with the object detection result; and while limiting the object detector to the first anchor box, generating, with the object detector, a saliency map for the image.

One or more example computer storage devices have computer-executable instructions stored thereon, which, on execution by a computer, cause the computer to perform operations comprising: performing, with an object detector, a first object detection process on an image, wherein the first object detection process employs a plurality of anchor boxes; identifying an object detection result for the image; determining, from among the plurality of anchor boxes, a first anchor box associated with the object detection result; and while limiting the object detector to the first anchor box, generating, with the object detector, a saliency map for the image.

Alternatively, or in addition to the other examples described herein, examples include any combination of the following:

- based on the saliency map, selecting further training data for the object detector;
- further training the object detector with the selected further training data;
- the saliency map comprises a gradient-based saliency map;
- the saliency map comprises a set of highlighted pixels that contributed to the object detection result;
- the object detection result identifies a bounding box that overlaps with the first anchor box in the image and differs from the first anchor box in size or position or both size and position;
- generating the saliency map comprises not employing another anchor box of the plurality of anchor boxes, other than the first anchor box;
- generating the saliency map comprises performing, with the object detector, a plurality of object detection processes on the image;
- generating the saliency map further comprises, for each object detection process of the plurality of object detection processes:
- altering a pixel of the image;
- performing an object detection process on the image with the altered pixel;
- determining an effect, on the object detection process, of altering the pixel;
- indicating, in the saliency map, the effect of altering the pixel;

determining, from among the plurality of anchor boxes, a second anchor box associated with the object detection result, the second anchor box differing from the first anchor box in size or position or both size and position;
while limiting the object detector to the second anchor box, generating, with the object detector, a second saliency map for the image;
receiving training data for the object detector;
the object detector comprises an anchor-based object detector;
training the object detector;
auditing the object detector;
auditing the object detector comprises generating the saliency map;
auditing the object detector comprises generating the second saliency map;
debugging the object detector;
debugging the object detector comprises generating the saliency map;
debugging the object detector comprises generating the second saliency map;
receiving the image;
the image is within the training data;
the image is within test data;
refining the first anchor box into the bounding box;
bounding box that overlaps with the second anchor box in the image and differs from the second anchor box in size and/or position;
identifying the object detection result comprises receiving an input from a UI;
generating the saliency map comprises determining a gradient;
determining the gradient comprises performing, with the object detector, a plurality of object detection processes on the image;
determining the gradient further comprises, for each object detection process of the plurality of object detection processes: altering a pixel of the image; performing an object detection process on the image with the altered pixel; and determining an effect, on the object detection process, of altering the pixel;
generating the saliency map comprises suppressing non-differentiable filtering layers of the object detector;
generating the saliency map comprises applying an attribution technique;
the saliency map comprises a gradient-based saliency map;
the saliency map comprises a set of highlighted pixels that contributed to the object detection result;
based on the saliency map, determining whether the object detector requires further training;
based on the second saliency map, determining whether the object detector requires further training; and
based on the second saliency map, selecting further training data for the object detector.

While the aspects of the disclosure have been described in terms of various examples with their associated operations, a person skilled in the art would appreciate that a combination of operations from any number of different examples is also within scope of the aspects of the disclosure.

Example Operating Environment

Figure 10:
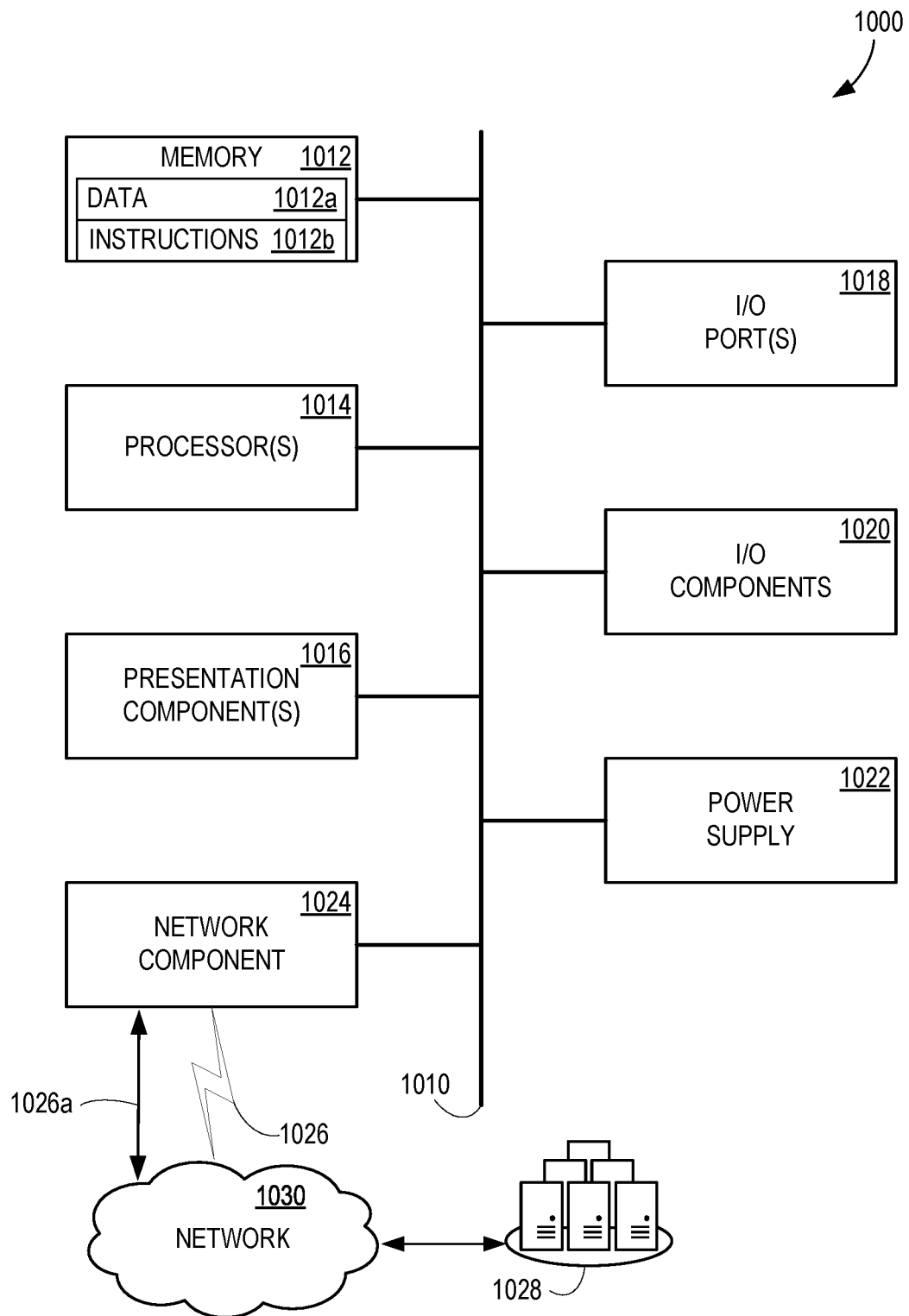
FIG. 10 shows a block diagram of an example computing device suitable for implementing some of the various examples disclosed herein.

FIG. 10 is a block diagram of an example computing device 1000 (e.g., a computer storage device) for implementing aspects disclosed herein, and is designated generally as computing device 1000. In some examples, one or more computing devices 1000 are provided for an on-premises computing solution. In some examples, one or more computing devices 1000 are provided as a cloud computing solution. In some examples, a combination of on-premises and cloud computing solutions are used. Computing device 1000 is but one example of a suitable computing environment and is not intended to suggest any limitation as to the scope of use or functionality of the examples disclosed herein, whether used singly or as part of a larger set.

Neither should computing device 1000 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1000 includes a bus 1010 that directly or indirectly couples the following devices: computer storage memory 1012, one or more processors 1014, one or more presentation components 1016, input/output (I/O) ports 1018, I/O components 1020, a power supply 1022, and a network component 1024. While computing device 1000 is depicted as a seemingly single device, multiple computing devices 1000 may work together and share the depicted device resources. For example, memory 1012 may be distributed across multiple devices, and processor(s) 1014 may be housed with different devices.

Bus 1010 represents what may be one or more busses (such as an address bus, data bus, or a combination thereof). Although the various blocks of FIG. 10 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 10 and the references herein to a "computing device." Memory 1012 may take the form of the computer storage media referenced below and operatively provide storage of computer-readable instructions, data structures, program modules and other data for the computing device 1000. In some examples, memory 1012 stores one or more of an operating system, a universal application platform, or other program modules and program data. Memory 1012 is thus able to store and access data 1012a and instructions 1012b that are executable by processor 1014 and configured to carry out the various operations disclosed herein.

In some examples, memory 1012 includes computer storage media. Memory 1012 may include any quantity of memory associated with or accessible by the computing device 1000. Memory 1012 may be internal to the computing device 1000 (as shown in FIG. 10), external to the computing device 1000 (not shown), or both (not shown). Additionally, or alternatively, the memory 1012 may be distributed across multiple computing devices 1000, for example, in a virtualized environment in which instruction processing is carried out on multiple computing devices 1000. For the purposes of this disclosure, "computer storage media," "computer-storage memory," "memory," and "memory devices" are synonymous terms for the computer-storage memory 1012, and none of these terms include carrier waves or propagating signaling.

Processor(s) 1014 may include any quantity of processing units that read data from various entities, such as memory 1012 or I/O components 1020. Specifically, processor(s) 1014 are programmed to execute computer-executable instructions for implementing aspects of the disclosure. The instructions may be performed by the processor, by multiple processors within the computing device 1000, or by a processor external to the client computing device 1000. In some examples, the processor(s) 1014 are programmed to execute instructions such as those illustrated in the flow charts discussed below and depicted in the accompanying drawings. Moreover, in some examples, the processor(s) 1014 represent an implementation of analog techniques to perform the operations described herein. For example, the operations may be performed by an analog client computing device 1000 and/or a digital client computing device 1000. Presentation component(s) 1016 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1000, across a wired connection, or in other ways. I/O ports 1018 allow computing device 1000 to be logically coupled to other devices including I/O components 1020, some of which may be built in. Example I/O components 1020 include, for example but without limitation, a microphone, joystick, game pad, satellite dish, scanner, printer, wireless device, etc.

Computing device 1000 may operate in a networked environment via the network component 1024 using logical connections to one or more remote computers. In some examples, the network component 1024 includes a network interface card and/or computer-executable instructions (e.g., a driver) for operating the network interface card. Communication between the computing device 1000 and other devices may occur using any protocol or mechanism over any wired or wireless connection. In some examples, network component 1024 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1024 communicates over wireless communication link 1026 and/or a wired communication link 1026a to a remote resource 1028 (e.g., a cloud resource) across network 1030. Various different examples of communication links 1026 and 1026a include a wireless connection, a wired connection, and/or a dedicated link, and in some examples, at least a portion is routed through the internet.

Although described in connection with an example computing device 1000, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   a processor; and
   a computer-readable medium storing instructions that are operative upon execution by the processor to:
   perform, with an object detector, a first object detection process on an image, wherein the first object detection process employs a plurality of anchor boxes; identify an object detection result for the image;
   determine, from among the plurality of anchor boxes, a first anchor box associated with the object detection result; and
   generate a saliency map for the image using only the first anchor box.

2. The system of claim 1, wherein the instructions are further operative to:
   based on the saliency map, select further training data for the object detector; and
   further train the object detector with the selected further training data.

3. The system of claim 1, wherein the saliency map comprises a gradient-based saliency map, and wherein the saliency map comprises a set of highlighted pixels that contributed to the object detection result.

4. The system of claim 1, wherein the object detection result identifies a bounding box that overlaps with the first anchor box in the image and differs from the first anchor box in size or position or both size and position.

5. The system of claim 1, wherein generating the saliency map comprises:
   not employing another anchor box of the plurality of anchor boxes, other than the first anchor box.

6. The system of claim 1, wherein generating the saliency map comprises:
   performing, with the object detector, a plurality of object detection processes on the image; and
   for each object detection process of the plurality of object detection processes:
   altering a pixel of the image;
   performing an object detection process on the image with the altered pixel;
   determining an effect, on the object detection process, of altering the pixel; and
   indicating, in the saliency map, the effect of altering the pixel.

7. The system of claim 1, wherein the instructions are further operative to:
   determine, from among the plurality of anchor boxes, a second anchor box associated with the object detection result, the second anchor box differing from the first anchor box in size or position or both size and position; and
   while limiting the object detector to the second anchor box, generate, with the object detector, a second saliency map for the image.

8. A computerized method comprising:
   performing, with an object detector, a first object detection process on an image, wherein the first object detection process employs a plurality of anchor boxes;
   identifying an object detection result for the image;
   determining, from among the plurality of anchor boxes, a first anchor box associated with the object detection result; and
   generating a saliency map for the image using only the first anchor box.

9. The method of claim 8, further comprising:
   based on the saliency map, selecting further training data for the object detector; and
   further training the object detector with the selected further training data.

10. The method of claim 8, wherein the saliency map comprises a gradient-based saliency map.

11. The method of claim 8, wherein the object detection result identifies a bounding box that overlaps with the first anchor box in the image and differs from the first anchor box in size or position or both size and position.

12. The method of claim 8, wherein generating the saliency map comprises:
    not employing another anchor box of the plurality of anchor boxes, other than the first anchor box.

13. The method of claim 8, wherein generating the saliency map comprises:
    performing, with the object detector, a plurality of object detection processes on the image; and
    for each object detection process of the plurality of object detection processes:
    altering a pixel of the image;
    performing an object detection process on the image with the altered pixel;
    determining an effect, on the object detection process, of altering the pixel; and
    indicating, in the saliency map, the effect of altering the pixel.

14. The method of claim 8, further comprising:
    determining, from among the plurality of anchor boxes, a second anchor box associated with the object detection result, the second anchor box differing from the first anchor box in size or position or both size and position; and
    while limiting the object detector to the second anchor box, generating, with the object detector, a second saliency map for the image.

15. One or more computer storage media having computer-executable instructions stored thereon, which, on execution by a computer, cause the computer to perform operations comprising:

performing, with an object detector, a first object detection process on an image, wherein the first object detection process employs a plurality of anchor boxes;

identifying an object detection result for the image; determining, from among the plurality of anchor boxes, a first anchor box associated with the object detection result; and generating a saliency map for the image using only the first anchor box.

16. The one or more computer storage devices of claim 15, wherein the operations further comprise:

based on the saliency map, selecting further training data for the object detector; and further training the object detector with the selected further training data.

17. The one or more computer storage devices of claim 15, wherein the object detection result identifies a bounding box that overlaps with the first anchor box in the image and differs from the first anchor box in size or position or both size and position.

18. The one or more computer storage devices of claim 15, wherein generating the saliency map comprises:

not employing another anchor box of the plurality of anchor boxes, other than the first anchor box.

19. The one or more computer storage devices of claim 15, wherein generating the saliency map comprises determining a gradient.

20. The one or more computer storage devices of claim 19, wherein determining a gradient comprises:

performing, with the object detector, a plurality of object detection processes on the image; and for each object detection process of the plurality of object detection processes:

altering a pixel of the image;

performing an object detection process on the image with the altered pixel; and determining an effect, on the object detection process, of altering the pixel.

* * * * *

UNITED STATES PATENT AND TRADEMARK OFFICE
CERTIFICATE OF CORRECTION

| | | |
|---|---|---|
| PATENT NO. | : 11,915,467 B1 | Page 1 of 1 |
| APPLICATION NO. | : 17/819305 | |
| DATED | : February 27, 2024 | |
| INVENTOR(S) | : James Brian Hall | |

It is certified that error appears in the above-identified patent and that said Letters Patent is hereby corrected as shown below:

On the Title Page

Column 1, insert the following:
--(65) Prior Publication Data US 2024-0054754 A1 Feb. 15, 2024--.

Signed and Sealed this
Eighth Day of October, 2024

Katherine Kelly Vidal
*Director of the United States Patent and Trademark Office*